(12) United States Patent
Lundell

(10) Patent No.: US 7,887,312 B2
(45) Date of Patent: Feb. 15, 2011

(54) TIRE BUILDING CORE

(75) Inventor: Dennis Alan Lundell, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 239 days.

(21) Appl. No.: 12/269,253

(22) Filed: Nov. 12, 2008

(65) Prior Publication Data

US 2010/0116439 A1    May 13, 2010

(51) Int. Cl.
  B29D 30/12    (2006.01)
  B29C 33/76    (2006.01)
(52) U.S. Cl. ............................. 425/54; 156/417; 425/55
(58) Field of Classification Search ................... 425/54, 425/55, 56, 57; 156/417
  See application file for complete search history.

(56) References Cited

U.S. PATENT DOCUMENTS

| | | | |
|---|---|---|---|
| 1,179,898 A | 4/1916 | Coffey et al. | |
| 1,343,504 A * | 6/1920 | Harris | 425/56 |
| 1,366,750 A * | 1/1921 | Smith et al. | 425/56 |
| 1,388,255 A | 8/1921 | Hardeman | |
| 1,454,995 A * | 5/1923 | Denmire | 156/417 |
| 1,466,527 A * | 8/1923 | Guiley | 425/55 |
| 1,529,654 A * | 3/1925 | Hurt | 425/56 |
| 1,602,132 A * | 10/1926 | Thropp et al. | 156/417 |
| 1,682,620 A | 8/1928 | Ledwinka | |
| 2,123,586 A | 7/1938 | Heston | 154/9 |
| 3,560,302 A | 2/1971 | Missioux | 156/515 |
| 3,607,558 A | 9/1971 | Nebout | 156/415 |
| 3,684,621 A | 8/1972 | Frazuer et al. | 156/401 |
| 3,767,509 A | 10/1973 | Gazuit | 146/415 |
| 3,833,445 A | 9/1974 | Mallory et al. | 156/401 |
| 3,868,203 A | 2/1975 | Turk | 425/242 |
| 4,007,080 A | 2/1977 | Klopper | 156/396 |
| 4,043,725 A | 8/1977 | Schmidt | 425/542 |
| 4,045,277 A | 8/1977 | Habert et al. | 156/417 |
| 4,083,672 A | 4/1978 | Vaishnav | 425/457 |
| 4,211,592 A | 7/1980 | Grawey | 156/123 |
| 4,728,274 A | 3/1988 | Siegenthaler | 425/34 R |
| 4,877,468 A | 10/1989 | Siegenthaler et al. | 156/111 |
| 4,895,692 A | 1/1990 | Laurent et al. | 264/326 |
| 5,047,108 A * | 9/1991 | Byerley | 156/417 |
| 5,201,975 A | 4/1993 | Holroyd et al. | 156/124 |
| 5,384,084 A | 1/1995 | Siegenthaler | 264/111 |
| 5,622,669 A | 4/1997 | Dailliez et al. | 264/403 |
| 5,853,526 A | 12/1998 | Laurent et al. | 156/398 |
| 6,113,833 A * | 9/2000 | Ogawa | 425/56 |

(Continued)

FOREIGN PATENT DOCUMENTS

DE    2002294    7/1971

(Continued)

*Primary Examiner*—James Mackey
(74) *Attorney, Agent, or Firm*—Richard B. O'Planick

(57) ABSTRACT

A tire building core assembly is provided including a segmented toroidal core formed by a plurality of core segments configured in a closely adjacent array defining an outer tire-building toroidal surface. The tire building surface is configured having tire tread and sidewall build locations. Adjacent core segments provide adjacent and opposed annularly directed peripheral edge surfaces, opposed edge surfaces having interlocking elements that selectively engage to operatively deter relative radial movement between the adjacent core segments. The interlocking elements selectively disengage to operatively facilitate a disassembly of the segmented toroidal core.

3 Claims, 10 Drawing Sheets

U.S. PATENT DOCUMENTS

| | | |
|---|---|---|
| 6,203,641 B1 | 3/2001 | Laurent et al. .......... 156/110.1 |
| 6,234,227 B1 | 5/2001 | Bosseaux .................... 156/398 |
| 6,250,356 B1 | 6/2001 | Cordaillat et al. .......... 156/400 |
| 6,318,432 B1 | 11/2001 | Caretta et al. ............... 152/552 |
| 6,406,575 B1 | 6/2002 | Baumgarten et al. ......... 156/96 |
| 6,669,457 B2 * | 12/2003 | Scarzello et al. .............. 425/55 |
| 2003/0157209 A1 | 8/2003 | Scarzello et al. .............. 425/35 |
| 2007/0125496 A1 * | 6/2007 | Lundell et al. .............. 156/414 |
| 2007/0251630 A1 * | 11/2007 | Marchini .................... 156/414 |

FOREIGN PATENT DOCUMENTS

| | | |
|---|---|---|
| EP | 0 468 342 | 7/1991 |
| EP | 0 893 237 | 1/1999 |
| EP | 0 928 679 | 7/1999 |
| EP | 1 090 729 | 4/2001 |
| GB | 167073 | 8/1921 |
| GB | 549905 | 12/1942 |
| GB | 1524369 | 9/1978 |
| JP | 11-291363 | 10/1999 |
| JP | 11-320567 | 11/1999 |
| JP | 2001-001342 | 1/2001 |
| JP | 2001-079850 | 3/2001 |
| JP | 2002-096403 | 4/2002 |
| WO | 82/00017 | 1/1982 |
| WO | 01/62481 | 5/2001 |
| WO | 02/45942 | 6/2002 |
| WO | 03/103935 | 12/2003 |
| WO | 2005/009724 | 2/2005 |

* cited by examiner

TIRE BUILDING CORE

FIELD OF THE INVENTION

The invention relates generally to a tire building core for use in the construction of an uncured tire and, more specifically, to a core assembly used in tire build construction and curing cycles.

BACKGROUND OF THE INVENTION

Historically, the pneumatic tire has been fabricated as a laminate structure of generally toroidal shape having beads, a tread, belt reinforcement, and a carcass. The tire is made of rubber, fabric, and steel. The manufacturing technologies employed for the most part involved assembling the many tire components from flat strips or sheets of material. Each component is placed on a building drum and cut to length such that the ends of the component meet or overlap creating a splice.

In the first stage of assembly the prior art carcass will normally include one or more plies, and a pair of sidewalls, a pair of apexes, an innerliner (for a tubeless tire), a pair of chafers and perhaps a pair of gum shoulder strips. Annular bead cores can be added during this first stage of tire building and the plies can be turned around the bead cores to form the ply turnups. Additional components may be used or even replace some of those mentioned above.

This intermediate article of manufacture would be cylindrically formed at this point in the first stage of assembly. The cylindrical carcass is then expanded into a toroidal shape after completion of the first stage of tire building. Reinforcing belts and the tread are added to this intermediate article during a second stage of tire manufacture, which can occur using the same building drum or work station.

This form of manufacturing a tire from flat components that are then formed toroidally limits the ability of the tire to be produced in a most uniform fashion. As a result, an improved method and apparatus has been proposed, the method involving building a tire sequentially on a core or toroidal body. The core or toroidal body rotates about its axis as tire components are applied layer by layer to the outer core surface. When the tire build procedure is completed on the core, the green tire will have a shape and dimension only slightly smaller than the finished tire. The aforementioned variances resulting from conventional drum expansion are thus eliminated. Building a tire on a core to a final tire shape, dimension, and uniformity therefore allows for improved quality control of the finished product.

Once component by component tire build is accomplished on the core, the green tire must be subjected to heat during a curing cycle. The tire and core may be as a unit subjected to heat within a curing cycle whereby the green tire is cured. It is important to maintain structural integrity of the annular tire building surface throughout the tire curing cycle and readily facilitate a subsequent separation of the core from the cured tire.

SUMMARY OF THE INVENTION

According to an aspect of the invention, a tire building core assembly is provided including a segmented toroidal core formed by a plurality of core segments configured in a closely adjacent array defining an outer tire-building toroidal surface. The tire building surface is configured having tire tread and sidewall build locations. Adjacent core segments provide adjacent and opposed annularly directed peripheral edge surfaces, opposed edge surfaces having interlocking elements that selectively engage to operatively deter relative radial movement between the adjacent core segments. The interlocking elements selectively disengage to operatively facilitate a disassembly of the segmented toroidal core.

In another aspect, the interlocking elements are configured as a projection and a detent positioned and shaped for mating engagement. The projection may include an elongate bar having a leading portion extending from one of the adjacent core segment edge surfaces and the detent may constitute an elongate groove having a sectional configuration complementing the leading portion of the elongate bar.

The projection leading portion may, pursuant to another aspect, be defined by a plurality of adjoining inwardly angled planar surfaces and the elongate groove defined by adjoining complementarily inwardly angled planar sidewall surfaces.

As a further aspect, the elongate bar and the elongate groove may be positioned on a radially outward crown region of a respective core segment edge surface and may be dimensioned to span the width of the respective crown region.

Definitions

"Aspect ratio" of the tire means the ratio of its section height (SH) to its section width (SW) multiplied by 100% for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Camber angle" means the angular tilt of the front wheels of a vehicle. Outwards at the top from perpendicular is positive camber; inwards at the top is negative camber.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Slip angle" means the angle of deviation between the plane of rotation and the direction of travel of a tire.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF THE INVENTION

Figure 1:
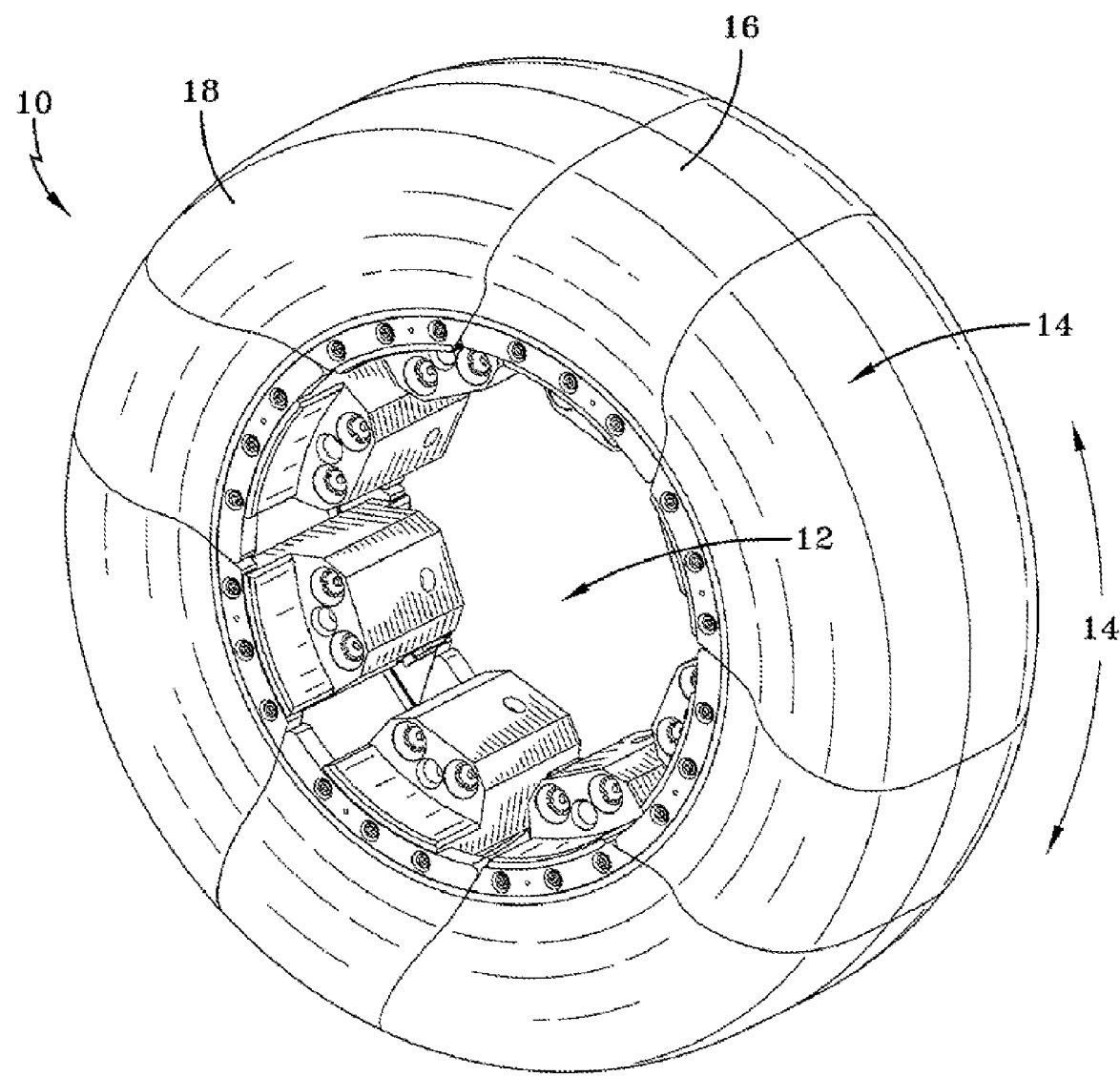
FIG. 1 is a front perspective view of an annular tire building core assembly.
Figure 2:
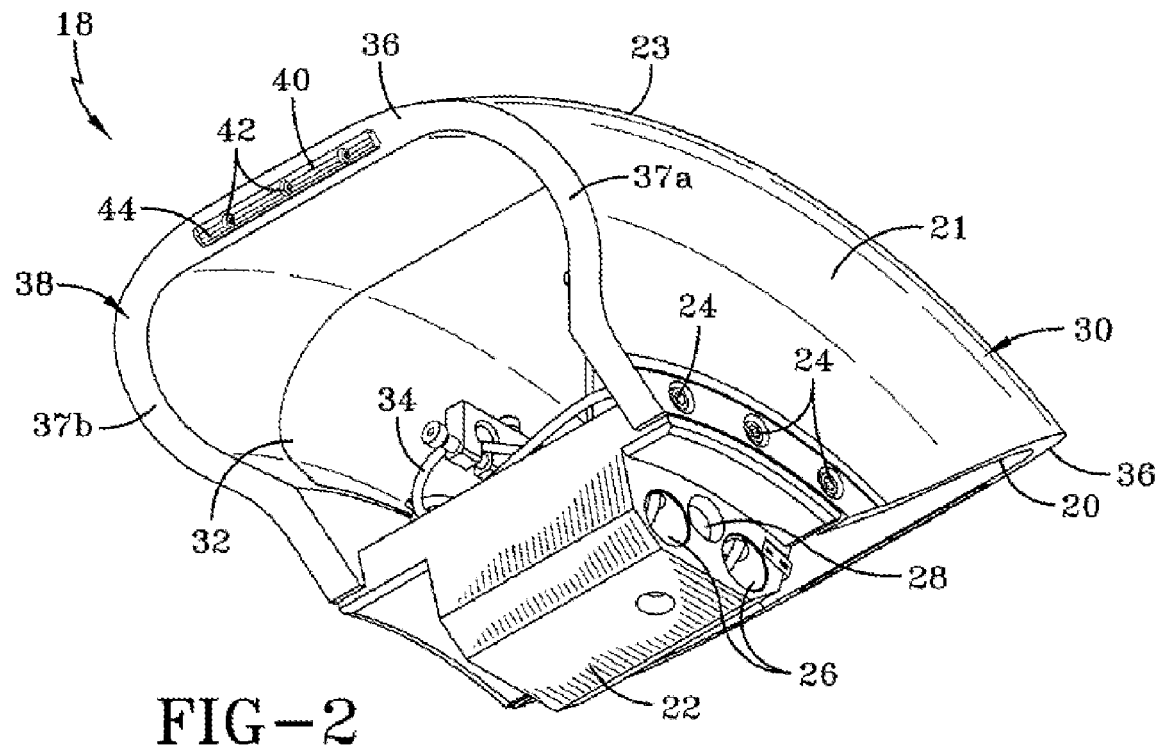
FIG. 2 is an enlarged front perspective view of a large core segment.

Referring initially to FIGS. 1 and 2, a tire building core assembly 10 is shown in the assembled configuration. The core assembly 10 includes an axial through bore 12 and is configured into a toroidal form substantially near the final shape and dimension of a tire. The core assembly 10 allows for a more accurate placement of tire components in the building of an uncured tire because the tire is built to near final shape. The core assembly 10 receives an elongate spindle assembly (not shown) through the axial throughbore 12. The core assembly and spindle configuration are disclosed in copending U.S. patent application Ser. No. 11/292,991 published Jun. 7, 2007, incorporated herein by reference. The core assembly 10 is constructed from alternate key shell segments 16 and large shell segments 18 that together form a toroidal body having a toroidal tire build surface 14. In general, the tire components are assembled to an outer toroidal surface 14 to form an uncured tire. The core assembly, including an uncured tire carried upon surface 14 may then be loaded into a mold for curing. During curing, the core assembly 10 provides additional curing heat through heating elements (explained following) located on the inside surface of core segments 16, 18. The core assembly 10 is removed from the cured tire by moving each core segment 16, 18 inward into the throughbore 12 and then axially removing each segment in a sequential disassembly procedure. The segments are removed from the cured tire, starting with the wedge shaped key segments 16. Once the key segments are pulled in radially, they may be removed axially from the tire followed by like removal of the large segments 18.

Figure 3:
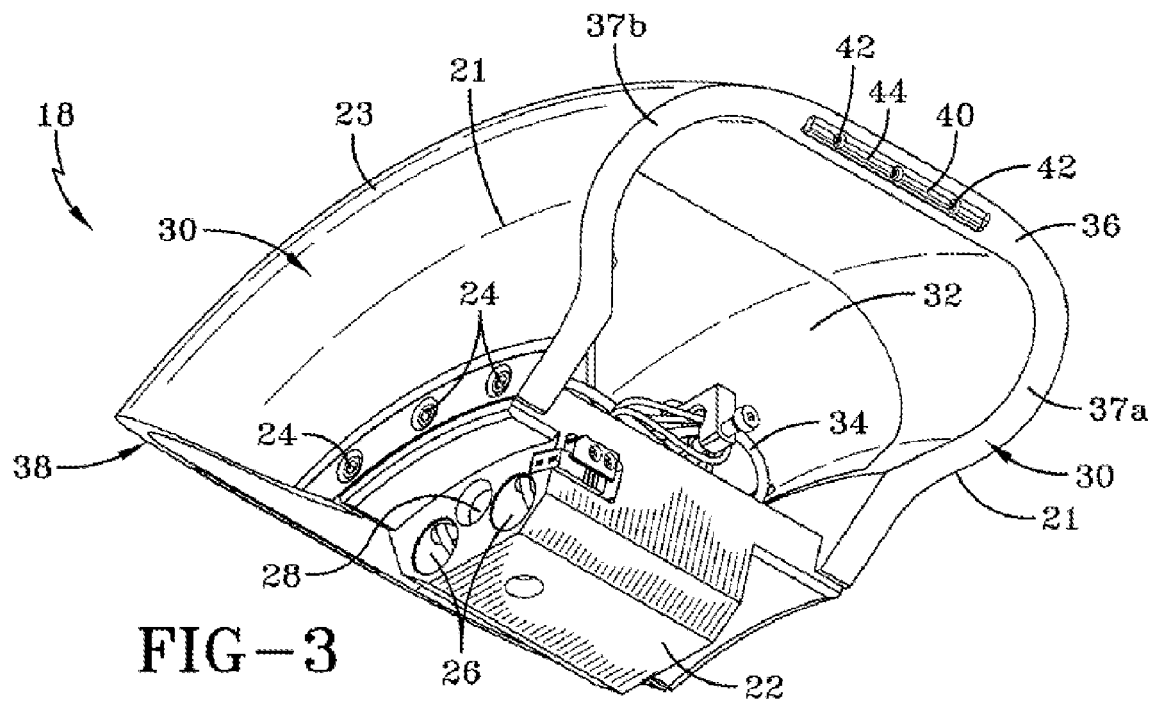
FIG. 3 is an enlarged rear perspective view of the large core segment of FIG. 2.
Figure 4:
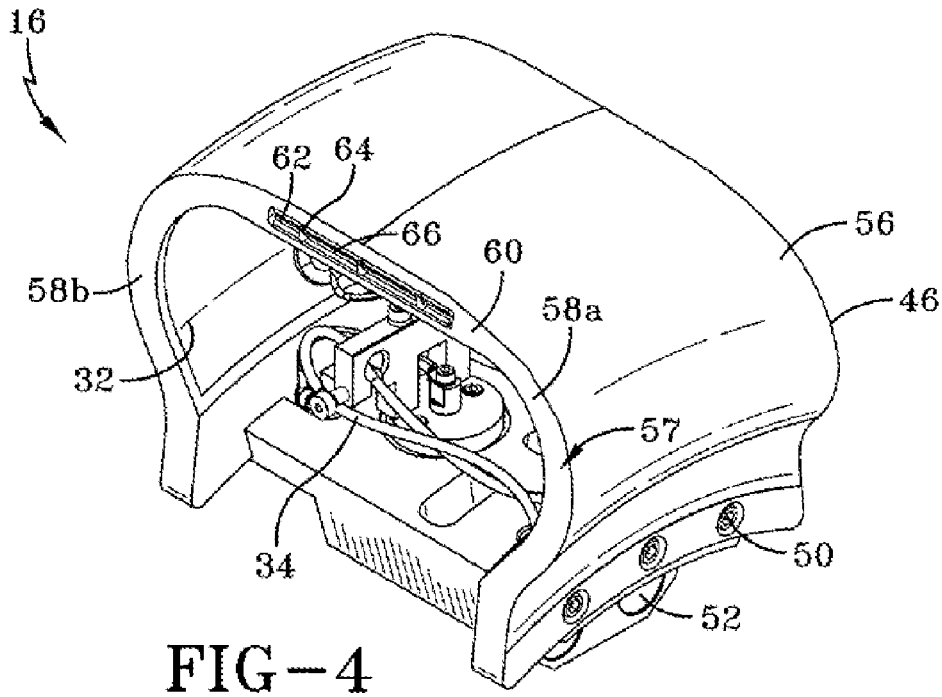
FIG. 4 is an enlarged front perspective view of a key core segment.
Figure 5:
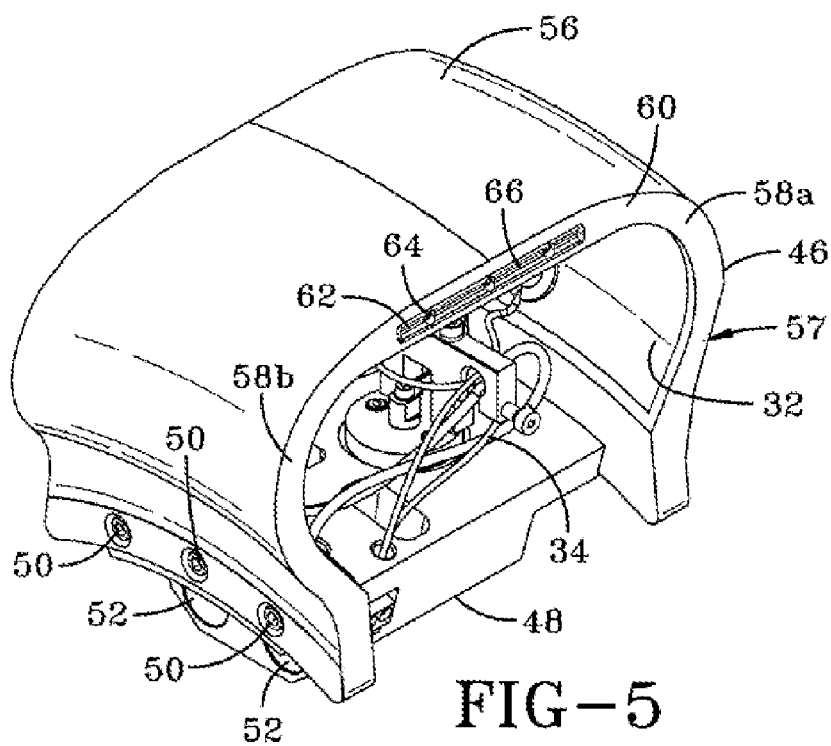
FIG. 5 is a rear perspective view of the key core segment of FIG. 4.
Figure 7:
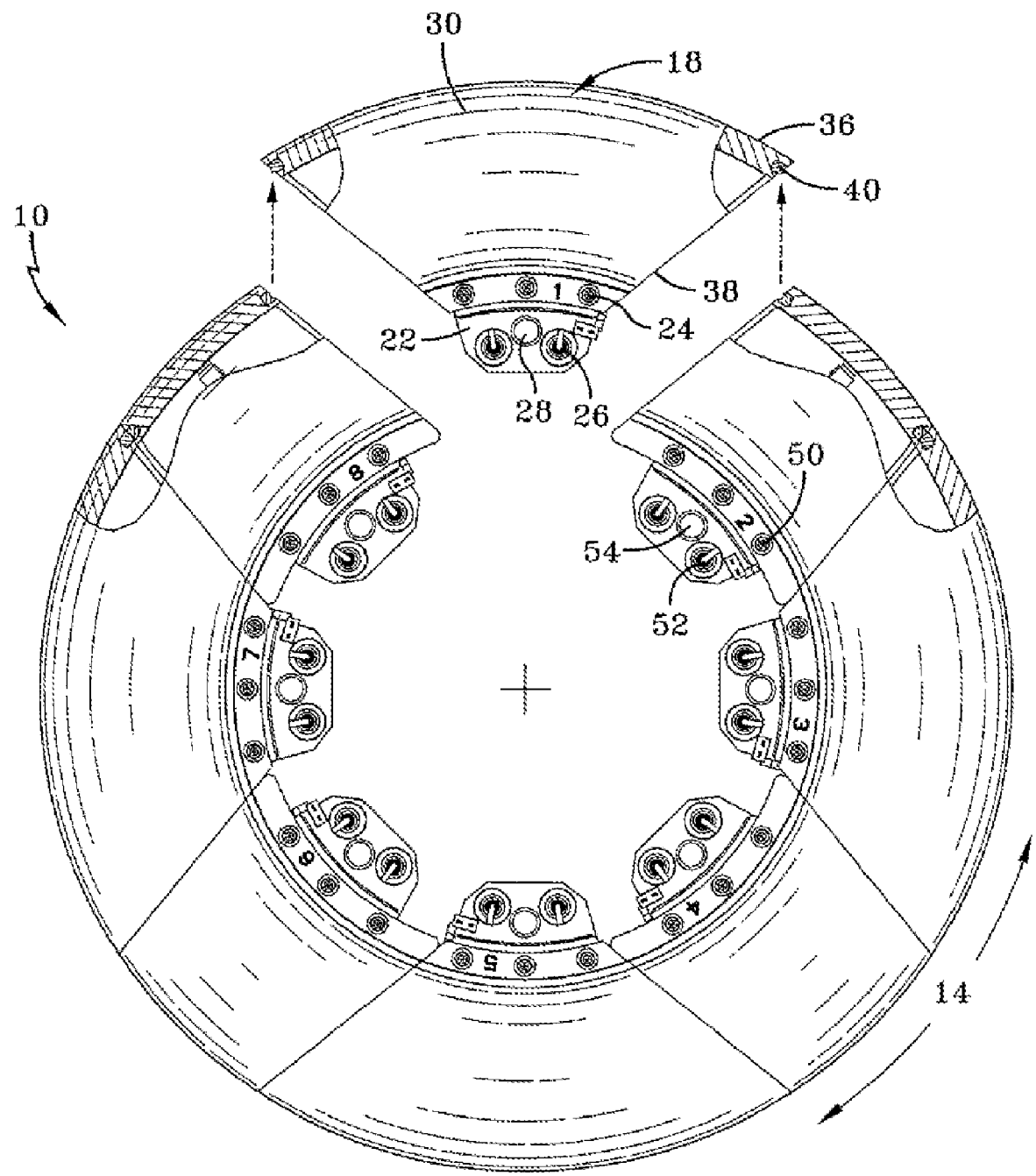
FIG. 7 is a side elevation view of the core of FIG. 6 shown in partial section with a large segment disassembled from the core for illustration.
Figure 8:
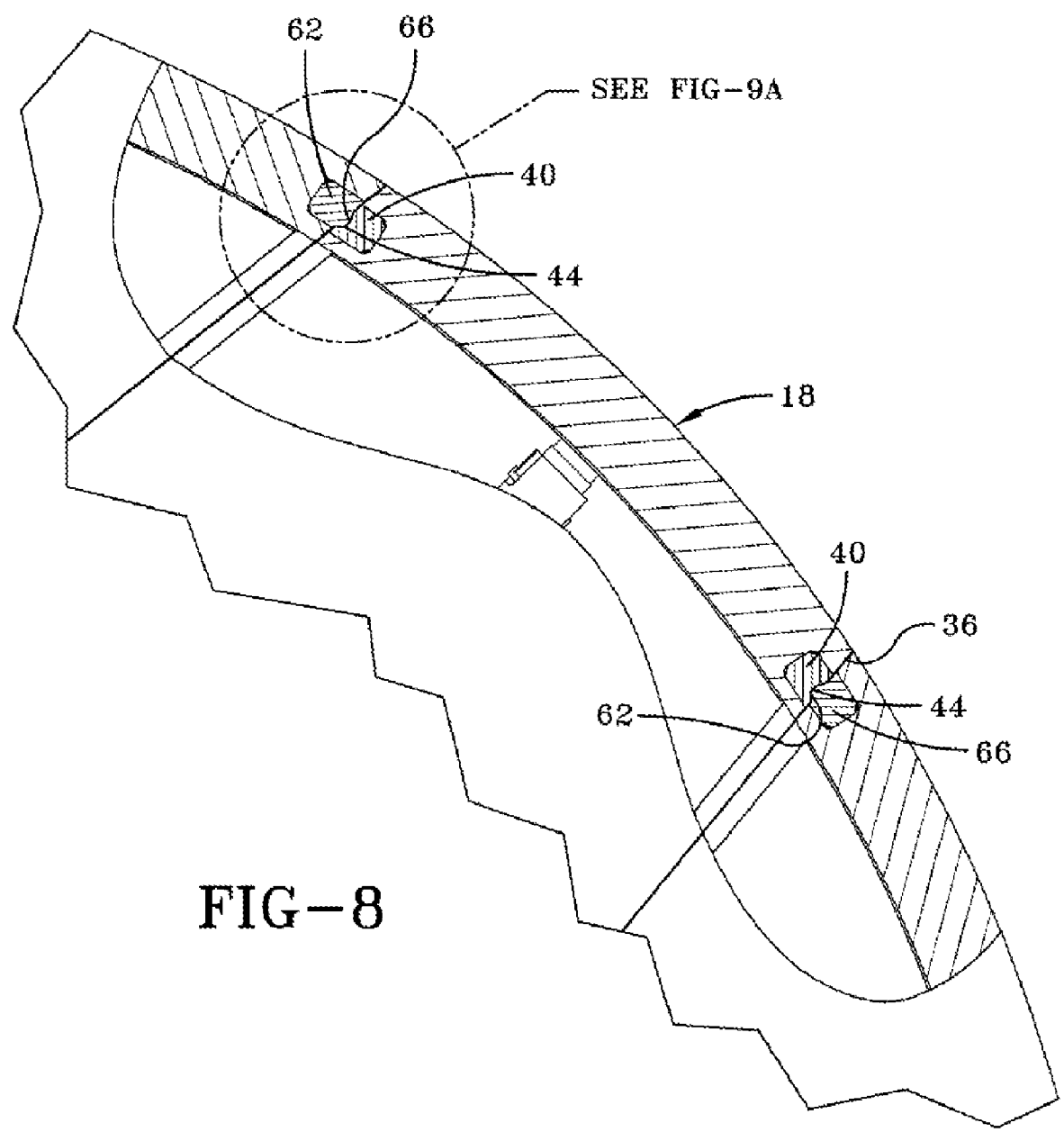
FIG. 8 is an enlarged sectional view of the designated portion of the core identified in FIG. 7.

Referring to FIGS. 2, 3 and 7, the core segments 18, referred herein as the (relatively) large segments, are seen to be configured generally as a hollow wedge-shaped shell body 20. The larger core segments 18 each have a narrower radially inward side and flare outwardly to a wider radially outward side. The shell body 20 defines tire sidewall-forming regions 21 and a radial outer tread-forming region 23 shaped and dimensioned to allow the build of a tire(s) thereon to a final dimension and configuration. The shell body 20 connects at the bottom with a connector block 22 by means of assembly screws 24. The connector block 22 has a pair of electrical connector receiving sockets 26 and an alignment throughbore 28 for interfacing with a spindle unit (not shown). The shell body 20 defines an outward surface 30 consisting of spaced apart sidewall regions 21 transitioning into a tread region 23, the regions 21, 23 being shaped in accordance with the tire to be built. A heating element 32 may be affixed to an inward surface of the shell body 20 that is serviced electrically through the electrical connectors 26 to heat the shell body 20 during a cure cycle. Wiring 34 is provided to supply power to the heating element 32.

Figure 9A:
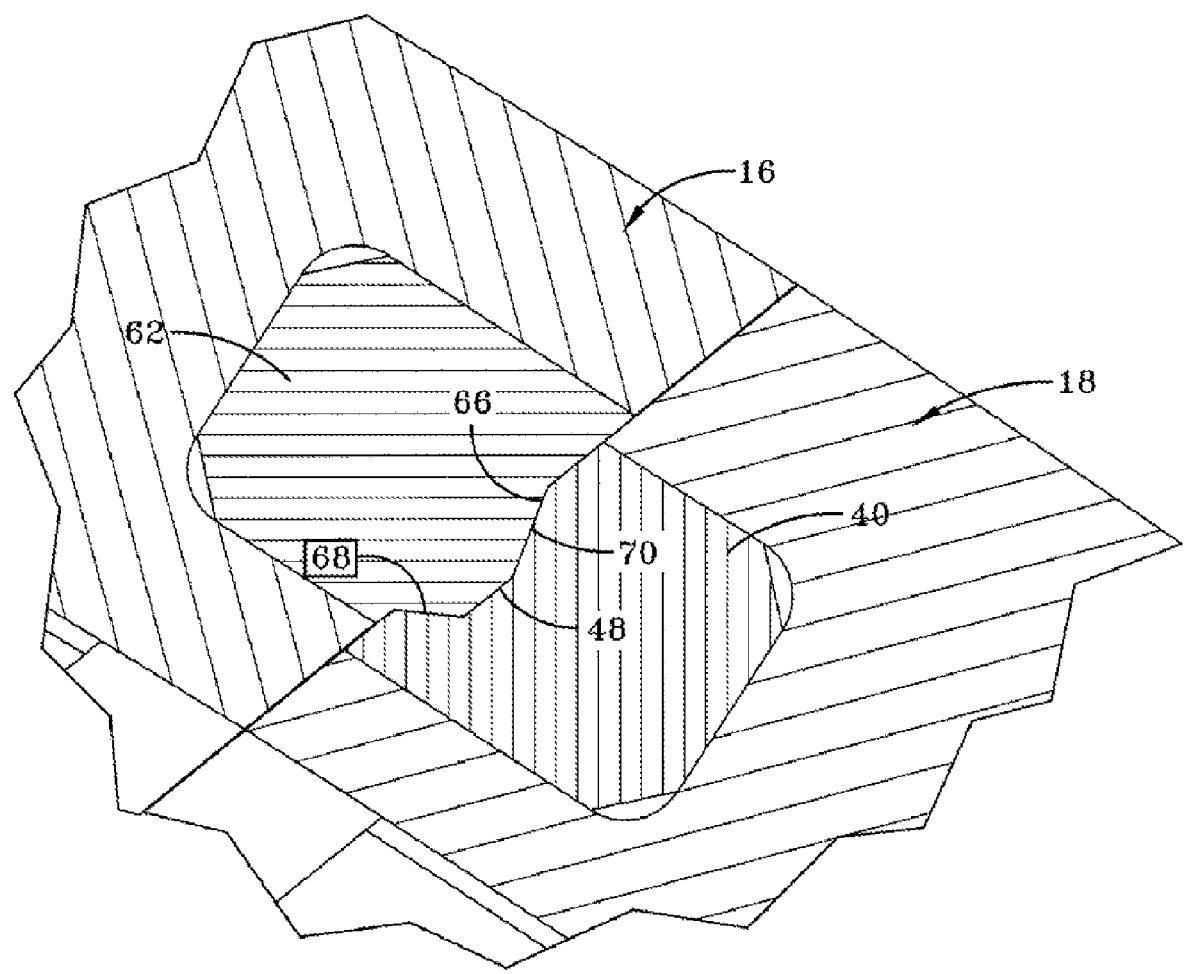
FIG. 9A is an enlarged sectional view of the designated mating insert portion of the core identified in FIG. 8.
Figure 9B:
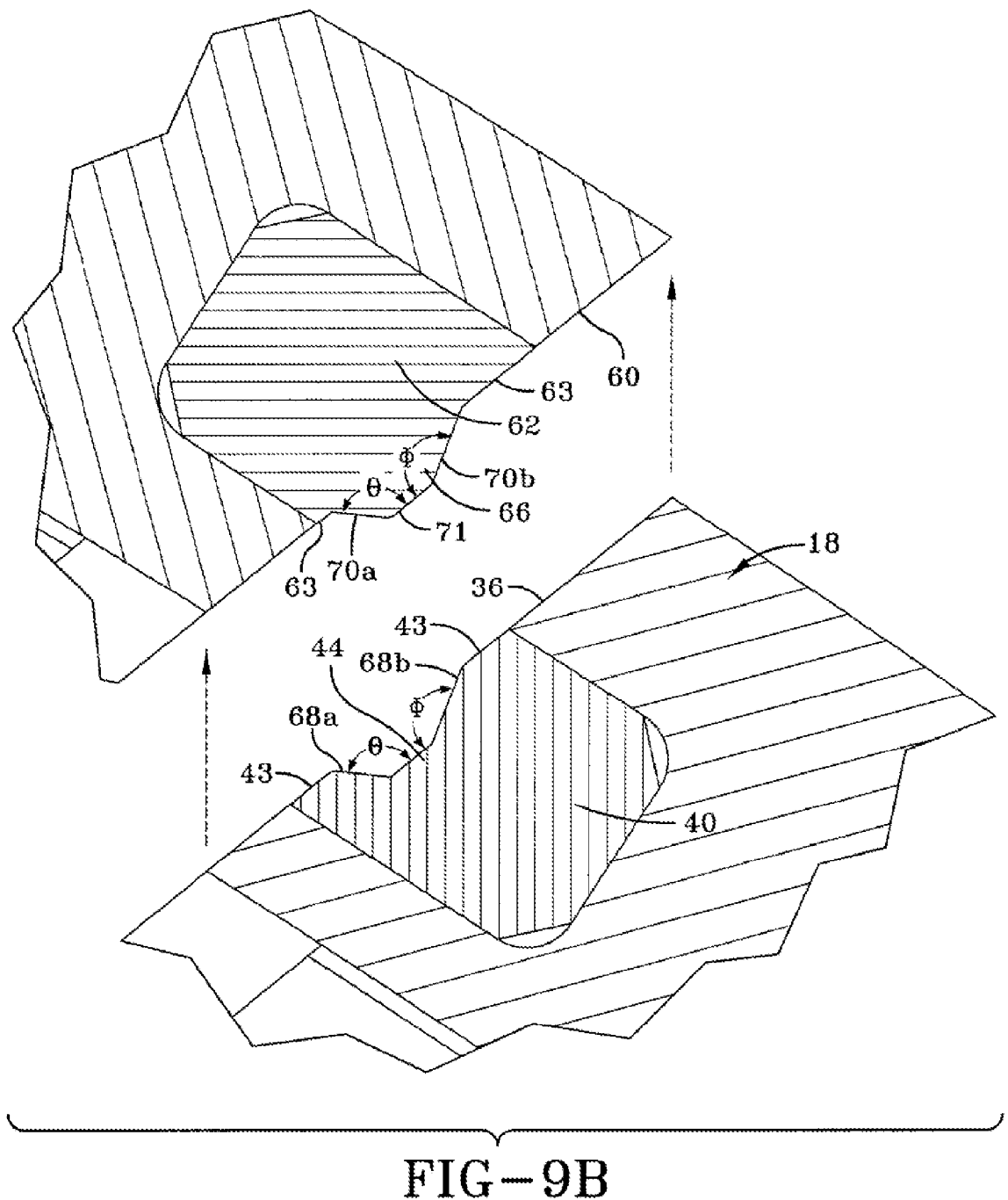
FIG. 9B is a sectional view of separated mating insert portions shown in FIG. 9A.
Figure 10:
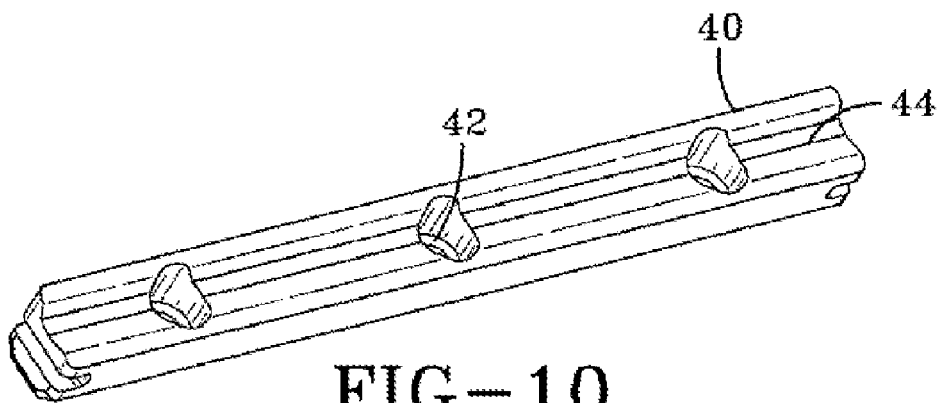
FIG. 10 is a top perspective view of an insert from a large core segment.
Figure 11:
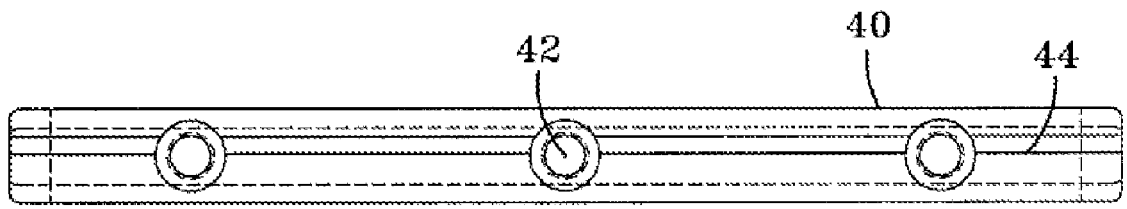
FIG. 11 is a top plan view thereof.
Figure 12:
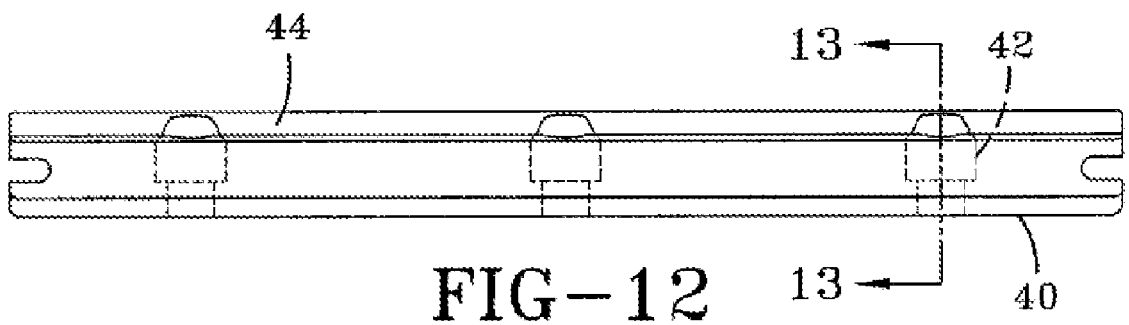
FIG. 12 is a side elevation view thereof.
Figure 13:
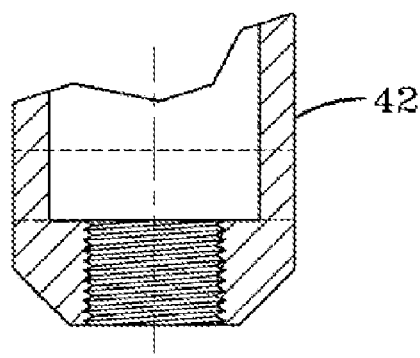
FIG. 13 is an enlarged section view of a connector screw used in affixing the insert.
Figure 14:
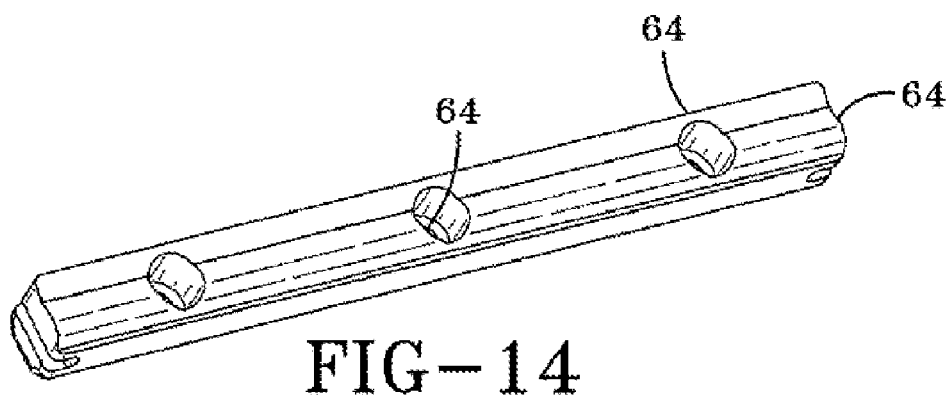
FIG. 14 is a top perspective view of an insert from a key core segment.
Figure 15:
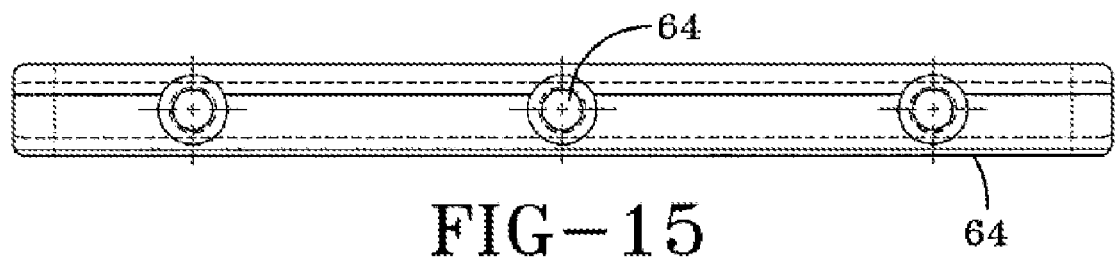
FIG. 15 is a top plan view thereof.
Figure 16:
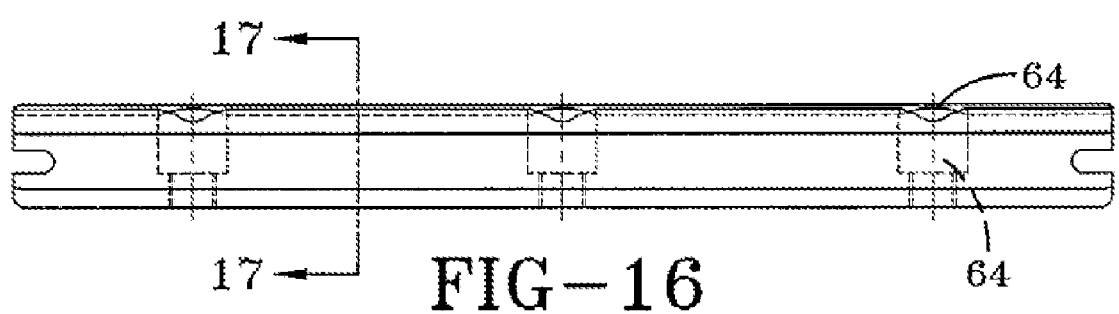
FIG. 16 is a side elevation view thereof.
Figure 17:
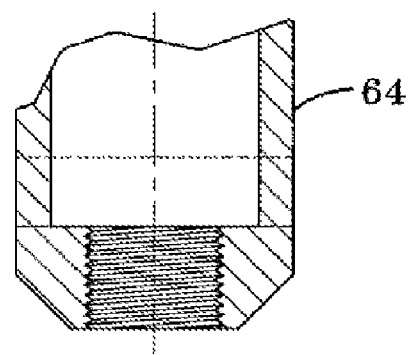
FIG. 17 is an enlarged section view of a connector screw used in affixing the key segment insert.

A pair of generally inverted-U shaped edge surfaces 38 border each side of the generally wedge shaped shell body 20 and face annularly outward. Each edge surface 38 includes side surfaces 37, 38 that transition into a radially outward crown region 36 of the edge surface 38. An elongate interlocking insert element 40 is affixed to the crown region 36 of the edge surfaces 38. The insert element 40 is attached to the shell body 20 by appropriate means such as screws 42 as shown. Extending axially along the insert element 40 is an elongate detent channel or groove 44 as shown in detail in FIGS. 9A and 9B. The channel 44 faces outwardly within the edge surface crown region 36. The insert element 40 mounts within a recess of edge surface region 36 such that edges 43 of the insert element 40 transition smoothly with the edge surface crown region 36.

With reference to FIGS. 4, 5, 7, and 8, the key segments 16 are alternately disposed with the large segments 18 to form the annular tire build surface 14. The segments each are configured to provide a generally hollow shell body 46 that connects at a radially inward end to a connector block 48 by appropriate means such as screws 50. Sockets 52 and an axial bore 54 extend through the block 48 in a manner similar with the block 22 explained previously. The wedge shaped shell body 46 provides an outer tire build surface 56.

A pair of generally inverted-U shaped edge surfaces 57 border each side of the generally wedge shaped shell body 46 and face annularly outward. Each edge surface 57 includes side surfaces 58A, B that transition into a radially outward crown region 60 of the edge surface 57. An elongate interlocking insert element 62 is affixed to the crown region 60 of the edge surfaces 57. The insert element 62 attaches to the shell body 46 by appropriate means such as screws 64 as shown. Extending axially along the insert element 62 and projecting outwardly is an elongate bar or rib 66 as shown in detail in FIGS. 9A and 9B. The rib or bar 66 faces outwardly from the edge surface crown region 60. The insert element 62 mounts within a recess of edge surface crown region 60 such that edges 63 of the insert element 62 transition smoothly with the edge surface crown region 60.

Figure 6:
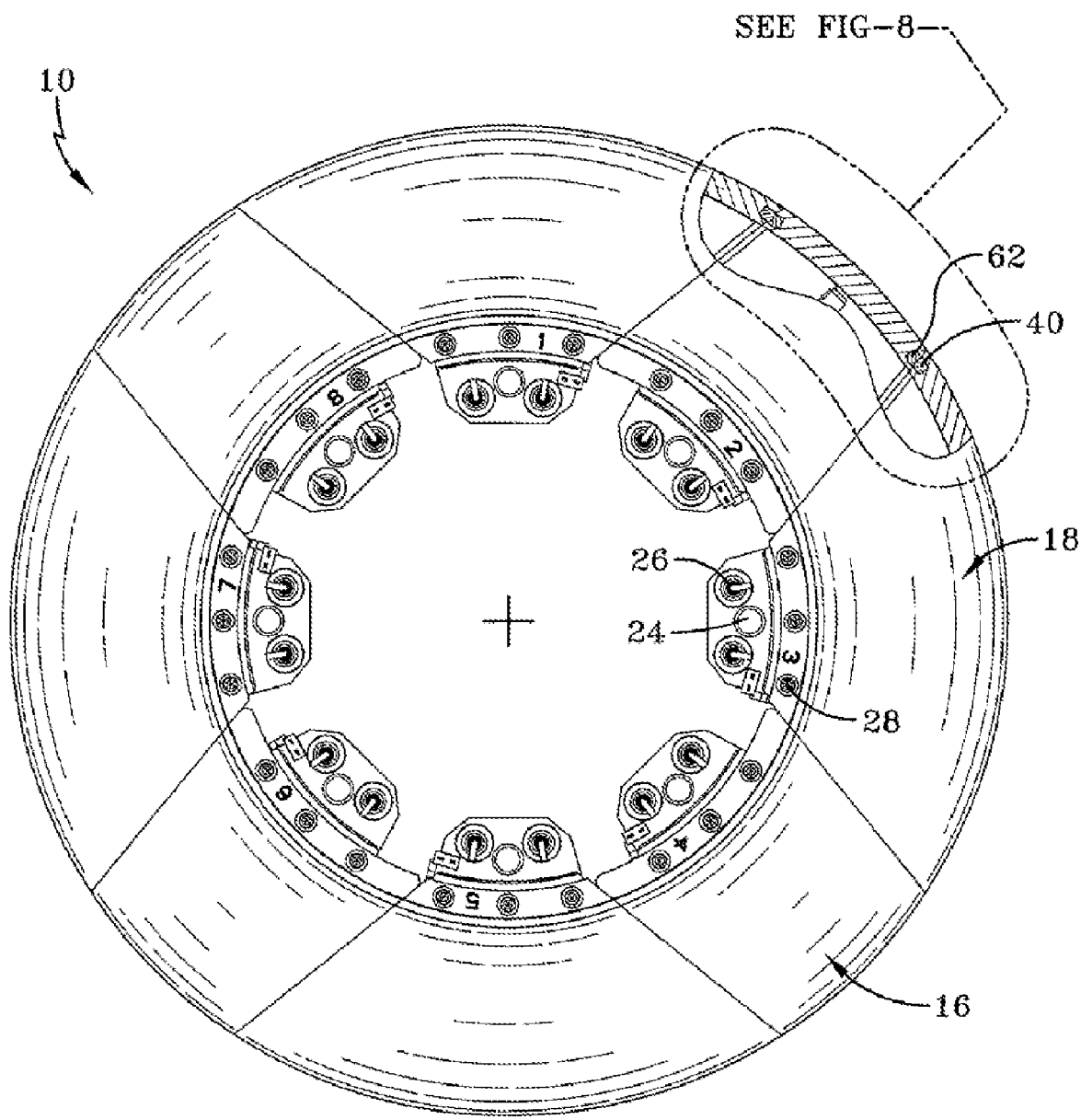
FIG. 6 is a side elevation view of an assembled core shown partially in section for illustration.

As best seen from FIGS. 6, 7, 8, 9A, 9B, and 10-17, the core assembly 10 is configured in an assembled state as a toroidal form by circumferentially adjacent and alternating key segments 16 and larger shell segments 18. Each segment is generally hollow and the respective edge surfaces 57, 38 of the adjacent segments 16, 18 within the assembled core are in closely spaced opposition. In the assembled condition, adjacent segments 16, 18 are so aligned that the insert element bars 66 of the key segments 16 enter into engagement with the insert element grooves 44 of the large segments 18. The engaging pairs of insert elements 66, 44 are along the surface to surface radial intersection of the segments 16, 18, as will be appreciated from FIG. 6. Moreover, the engaging pairs of insert elements 55, 44 are positioned along the radial outward periphery of the toroidal core 10 as shown in FIGS. 6 and 7. The peripheral location of the mating insert elements 55, 44 serve to deter radial relevant movement between respectively engaged core segments 16, 18 during the tire build and tire cure procedures, holding the core 10 in its intended form that closely duplicates that of the desired finished tire.

As will be appreciated from FIGS. 7, 8, 9A, 9B, and 10-17, the mating bar or rib 66 of the key segments 16 and the grooves or channels 44 of the large segments 18 have a complementary sectional profile such that a close surface to surface relationship is established when the bars 66 are situated within the channels 44. The bar 66 in the configuration shown includes sides 70 A,B that converge at respective angles θ,Φ to a planar forward nose surface 71. The channel 44 in the configuration shown is formed by complementary sides 68A, 68B that likewise converge at respective angles θ,Φ to a planar internal channel floor surface. The angles θ,Φ may be the same, however it is preferred that the angles differentiate within ranges of 95 to 135 degrees, and 120 to 170 degrees, respective. Extending in opposition at a sharper angle θ, surfaces 68A and 70A are aligned to resist radial movement of the core segments 16, 18 along the line of segment to segment abutment. The shallower angle Φ in opposed surfaces 68B, 70B facilitate ready separation of the core segments at the conclusion of a tire build and curing cycle.

From the foregoing, it will be understood that, during the cure cycle, large pressures are placed on the tire as a mold is closed and the tread and sidewalls are formed about the core assembly 10. Additional pressure is created as the metal core assembly 10 is heated to cure temperature and the rubber cures and swells in the enclosed space defined by the mold.

Such pressures may act to cause deflections in the tire building core segments 16, 18, particularly in the tread area. The segments 16, 18, as shown and described, are formed into alternately shaped key and large segments to allow the disassembly and removal of the core 10 from the cured tire. Because the segments 16, 18 are shaped differently, they deflect differently under the influence of the curing pressure. Specifically, the large segments 18 deflect into contact with the key segments 16. When the deflection is sufficient, the edge of the large segment 18 deforms radially outward on the ramp formed by the key segment contact. Conversely, the same contact forces the edge of the key segment 16 radially inward. Such deflections will tend to produce an edge or discontinuity, otherwise referred to as "step-offs" that is formed into the inside of the tire.

Eliminating the subject "step-offs" is accomplished by the addition of hardened inserts, composed preferably but not necessarily of hardened steel, to the edges of the segments 16, 18. Specifically, the crown edge regions 36, 60 of the segments. The insert elements or bodies 40, 66 represent mating teeth that engage under pressure and prevent the relative deflection between the segments 16, 18. Pairs of aligned segment inserts 40, 66 engage when the edges of the segments are forced together and the engagement prevents sliding of one segment against the other. The insert bar or rib depth and angles θ,Φ are effective in not preventing the segments 16, 18 from being disassembled once the tire has been cured. When disassembly of the core assembly from the tire is required, the key segments 16 are sequentially moved inward and out of the tire, followed by the large segments 18. With the locking inserts 40, 66 engaged, disassembly of the core assembly 10 is initiated by a small radially outward movement of approximately one millimeter of the two large segments 18 immediately on opposite sides of the key segment prior to removal of the key segment. Such initial movement releases the key segment for disassembly. Once the key segment is removed, the large segments on either side may be moved back to their neutral positions to await their disassembly and removal from the tire.

While the channel and bar insert engagement is shown to place the channel within the key segment insert, and the bar within the large segment insert, such need not necessarily be the case. The bar and channel locking inserts may be switched. Other tooth and detent groove, or other locking insert element configurations may also be employed without departing from the invention.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire building core assembly comprising:
   a segmented toroidal core formed by a plurality of core segments having crown and sidewall portions configured in an adjacent array defining an outer tire-building toroidal surface, adjacent core segments having adjacent and opposed annularly directed peripheral edge surfaces;

at least one pair of interlocking elements secured to the adjacent and opposed edge surfaces of the adjacent core segments, respectively, the interlocking elements operatively engaging to deter relative radial movement between the adjacent core segments; wherein the interlocking elements operatively disengage to facilitate a disassembly of the segmented toroidal core; wherein the interlocking elements comprise an elongate bar having a leading portion extending from one of the adjacent core segment edge surfaces and an elongate groove having a sectional configuration complementing the leading portion of the elongate bar;

wherein the elongate bar and the elongate groove extend along and substantially span respective radially outward crown regions of respective core segment edge surfaces.

2. A tire building core assembly comprising:

a segmented toroidal core formed by a plurality of core segments having crown and sidewall portions configured in an adjacent array defining an outer tire-building toroidal surface, adjacent core segments having adjacent and opposed annularly facing edge surfaces;

at least one pair of interlocking elements in the adjacent and opposed edge surfaces of the adjacent core segments, respectively the interlocking elements operatively engaging to deter relative radial movement between the adjacent core segments and operatively disengaging to facilitate disassembly of the toroidal core: wherein the interlocking elements are secured to respective crown regions of respective core segment edge surfaces and comprise an elongate bar having a leading portion extending from one of the adjacent core segment edge surfaces and an elongate groove having a sectional configuration complementing the leading portion of the elongate bar; and wherein the elongate bar and the elongate groove substantially extend across the crown region of the respective adjacent core segment edge surfaces.

3. A tire building core assembly comprising:

a segmented toroidal core formed by a plurality of core segments having crown and sidewall portions configured in an adjacent array defining an outer tire-building toroidal surface, adjacent core segments having adjacent and opposed annularly directed peripheral edge surfaces and interlocking elements secured to respective peripheral edge surfaces of the adjacent core segments, the interlocking elements operatively engaging to deter relative radial movement between the adjacent core segments in an assembled-core configuration and disengaging for core segment disassembly; and wherein the interlocking elements of the core segments comprise an elongate bar and cooperating elongate groove substantially spanning across respective crown regions of the respective core segment edge surfaces.

* * * * *